US010169576B2

(12) United States Patent
Ekambaram et al.

(10) Patent No.: US 10,169,576 B2
(45) Date of Patent: Jan. 1, 2019

(54) MALWARE COLLUSION DETECTION

(71) Applicant: International Business Machines Corporation, Armonk, NY (US)

(72) Inventors: Vijay Ekambaram, Tamilnadu (IN); Roger C. Snook, Charles Town, WV (US); Leigh Williamson, Austin, TX (US); Shinoj Zacharias, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 15/352,570

(22) Filed: Nov. 15, 2016

(65) Prior Publication Data

US 2018/0137275 A1    May 17, 2018

(51) Int. Cl.
*G06F 21/56* (2013.01)
*G06F 21/55* (2013.01)
*H04L 29/06* (2006.01)

(52) U.S. Cl.
CPC .......... *G06F 21/552* (2013.01); *G06F 21/554* (2013.01); *G06F 21/556* (2013.01);
(Continued)

(58) Field of Classification Search
CPC ........ G06F 21/566; G06F 21/52; G06F 21/56; G06F 21/564; G06F 21/554;
(Continued)

(56) References Cited

U.S. PATENT DOCUMENTS 8,726,386 B1 * 5/2014 McCorkendale ..... G06F 21/554
726/22
9,230,099 B1    1/2016 McCorkendale
(Continued)

FOREIGN PATENT DOCUMENTS

CN    104834862    8/2015

OTHER PUBLICATIONS

Hay et al., "Dynamic Detection of Inter-application Communication Vulnerabilities in Android," ISSTA, Baltimore, MD, Jul. 2015.

*Primary Examiner* — Lisa C Lewis
*Assistant Examiner* — Zhimei Zhu
(74) *Attorney, Agent, or Firm* — Steven M. Greenberg, Esq.; Shutts & Bowen LLP

(57) ABSTRACT

Embodiments of the invention provide for malware collusion detection in a mobile computing device. In one embodiment, a method for malicious inter-application interaction detection in a mobile computing device includes filtering applications installed in a mobile device to a set of related applications and then monitoring in the mobile device execution of the related applications in the set. The method additionally includes computing resource utilization of one of the related applications executing in a background of the mobile device while also computing execution performance of a different one of the related applications. Finally, the method includes responding to a determination that the computed resource utilization is high while the computed execution performance is poor by generating a notification in the display of the mobile device that the one of the related applications is suspected of malware collusion with the different one of the related applications.

15 Claims, 2 Drawing Sheets

(52) U.S. Cl.
CPC .............. *G06F 21/56* (2013.01); *G06F 21/55* (2013.01); *H04L 63/1416* (2013.01)

(58) Field of Classification Search
CPC ...... G06F 21/552; G06F 21/55; H04W 12/12; H04L 63/20; H04L 63/145; H04L 63/1416; H04L 63/1425; H04L 63/1441; H04L 63/1408; H04L 63/14
See application file for complete search history.

(56) References Cited

U.S. PATENT DOCUMENTS

| | | | | |
|---|---|---|---|---|
| 9,749,342 | B1* | 8/2017 | Krage | G06F 9/46 |
| 2013/0332846 | A1* | 12/2013 | Freedman | H01B 7/292 |
| | | | | 715/745 |
| 2014/0113588 | A1* | 4/2014 | Chekina | G06F 21/552 |
| | | | | 455/410 |
| 2014/0317734 | A1* | 10/2014 | Valencia | G06F 21/552 |
| | | | | 726/22 |
| 2014/0329460 | A1* | 11/2014 | Loutit | G06Q 40/08 |
| | | | | 455/39 |
| 2015/0067830 | A1* | 3/2015 | Johansson | H04L 63/1408 |
| | | | | 726/22 |
| 2015/0121524 | A1* | 4/2015 | Fawaz | G06F 21/566 |
| | | | | 726/23 |
| 2015/0286820 | A1* | 10/2015 | Sridhara | G06F 21/566 |
| | | | | 726/23 |
| 2015/0347262 | A1* | 12/2015 | Vyas | G06F 11/3409 |
| | | | | 718/104 |
| 2016/0098697 | A1* | 4/2016 | Dunsmore | G06Q 20/32 |
| | | | | 705/39 |
| 2016/0149937 | A1* | 5/2016 | Katmor | H04L 63/0263 |
| | | | | 726/23 |
| 2016/0212709 | A1* | 7/2016 | Park | H04W 52/0251 |
| 2016/0381027 | A1* | 12/2016 | Mitchell | H04L 63/10 |
| | | | | 726/3 |
| 2017/0041309 | A1* | 2/2017 | Ekambaram | G06F 21/64 |
| 2017/0285977 | A1* | 10/2017 | Zhou | G06F 12/0638 |
| 2017/0289181 | A1* | 10/2017 | Wang | H04L 63/1416 |
| 2018/0018456 | A1* | 1/2018 | Chen | H04L 63/1441 |
| 2018/0095798 | A1* | 4/2018 | Kluck | G06F 9/5027 |

* cited by examiner

MALWARE COLLUSION DETECTION

BACKGROUND OF THE INVENTION

Field of the Invention

The present invention relates to mobile application and wearable application interoperation with other mobile applications and wearable applications and more particularly to detecting malware collusion in a mobile device.

Description of the Related Art

Interoperability is a characteristic of a product or system, whose interfaces are completely understood, to work with other products or systems, present or future, in either implementation or access, without any restrictions. In computing, interoperability often relates to two or more different computer programs ("applications") co-existing within the same computing environment. Co-existence ordinarily implies that each different application executing in a computing environment operates without having been retarded by the operation of another application. Previously, co-existence referred to the separate and isolated execution of each application in the same computing environment. More recently, co-existence includes the notion of separately executing but cooperatively executing applications in the same environment, and, on occasion, interaction between separately executing applications.

Application co-existence in a single mobile device, however, is not without risk, however. Whereas the potential for enhancing the functionality of two co-existing applications remains great, the potential for abuse also remains. In this regard, co-operable applications enjoy the potential to access permission-protected information of one another through use of embedded communication mechanisms supplied by the underlying operating system. So much is particularly true of mobile computing environments including smart phones and wearable computing devices. For instance, the "Intent" mechanism in one such operating system allows co-existing applications to cause mischief with other co-existing applications through "inter-application invocations"—that is, the invocation by one application of a core logical component of another application in the same computing device, for example an "Activity" class instance.

Typical forms of mischief caused by the abusive utilization of malware collusions include tampering with the private data of a co-existing application, blocking notifications by a co-existing application, degrading the performance of a co-existing application by diverting or otherwise blocking or limiting access to resources by the co-existing application and obscuring a display of information by the co-existing application. In many instances, the end user remains unaware of the abusive operations of the offending application in obstructing the operation of a co-existing application.

BRIEF SUMMARY OF THE INVENTION

Embodiments of the present invention address deficiencies of the art in respect to malware collusions and provide a novel and non-obvious method, system and computer program product for malware collusion detection in a mobile computing device. In an embodiment of the invention, a method for malware collusion detection in a mobile computing device includes filtering applications installed in a mobile device to a set of related applications and then monitoring in the mobile device execution of the related applications in the set. The method additionally includes computing resource utilization, such as memory consumption or an imparted load on a network stack of the mobile device, by one of the related applications executing in a background of the mobile device, while also computing execution performance of a different one of the related applications. Finally, the method includes responding to a determination that the computed resource utilization is high while the computed execution performance is poor by generating a notification in the display of the mobile device that the one of the related applications is suspected of malware collusion with the different one of the related applications.

In one aspect of the embodiment, the filtering includes receiving in memory of the mobile device from a server from over a computer communications network, a graph of the applications installed in the mobile device describing a relatedness between each of the applications, and selecting for inclusion in the set of related applications, only applications indicated by the graph to be related. In another aspect of the embodiment, the monitoring additionally includes measuring resource utilization of each of the related applications when executing in the background of the mobile device while each other of the related applications does not execute in the foreground, so that the determination of high computed resource utilization while the computed execution performance is poor is computed relative to previously monitored resource utilization of the one of the related applications when the different one of the related applications does not execute in the foreground of the mobile device. In yet another aspect of the embodiment, the received graph is a portion of a larger graph of additional applications published for distribution to a multiplicity of mobile devices, and wherein the larger graph is annotated to indicate the one of the related applications suspected of malware collusion with the different one of the related applications.

In another embodiment of the invention, a mobile data processing system is configured for malware collusion detection. The system includes a mobile device with memory, at least one processor and a display. The system also includes a multiplicity of applications installed in the mobile device. Finally, the system includes a detection module also installed in the mobile device and executing in the memory of the mobile device. The module includes program code enabled during execution to filter the applications to a set of related applications, monitor execution of the related applications in the set, compute resource utilization of one of the related applications executing in a background of the mobile device while also computing execution performance of a different one of the related applications, and respond to a determination that the computed resource utilization is high while the computed execution performance is poor by generating a notification in the display that the one of the related applications is suspected of malware collusion with the different one of the related applications.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for malware collusion detection in a mobile computing device. In accordance with an embodiment of the invention, applications installed onto a mobile device are classified in terms of how related each of the applications is to one another so as to identify applications of common function. Then, operational characteristics of two different related ones of the applications executing in memory of the mobile device are monitored by a security application also executing in the memory of the mobile device. When one of the two different applications executes in the foreground of the mobile device while the other of the two different applications executes in the background of the mobile device, the performance of the application executing in the foreground is measured as is the resource utilization of the application executing in the background. To the extent that the background application is determined to consume a high degree of resources of the mobile device at the expense of the performance of the foreground application, the background application is labeled potentially hostile to the foreground application and a notice is generated in a display of the mobile device.

Figure 1:
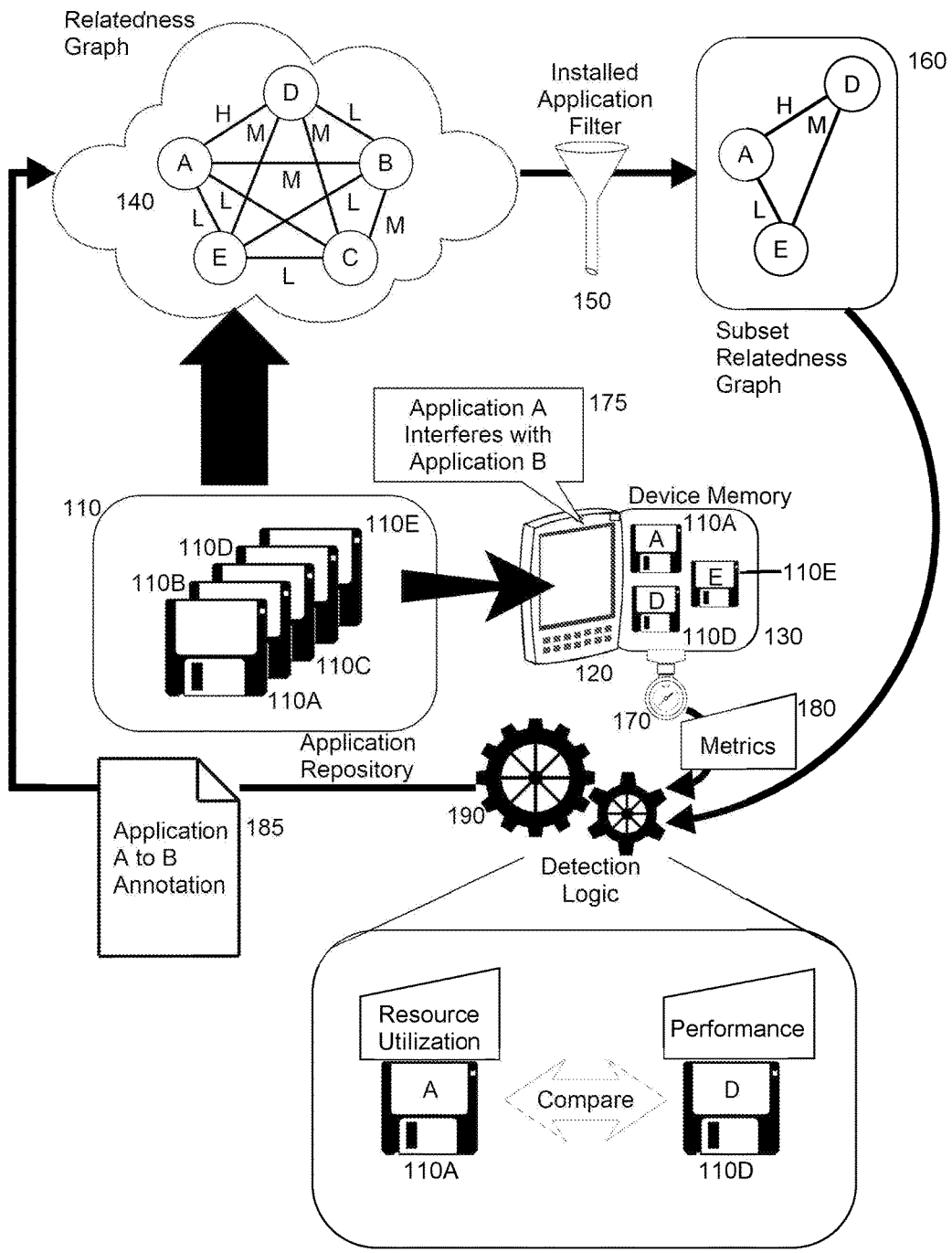
FIG. 1 is a pictorial illustration of a process for malware collusion detection in a mobile computing device.

In further illustration, FIG. 1 is a pictorial illustration of a process for malicious inter-application interaction detection in a mobile computing device. As shown in FIG. 1, an application repository 110 stores a multiplicity of different mobile applications 110A, 110B, 110C, 110D, 110E published for deployment onto different mobile devices 120 such as a smartphone, tablet computer or wearable computing device. A relatedness graph 140 is generated for the different mobile applications 110A, 110B, 110C, 110D, 110E. The relatedness graph 140 indicates a relatedness between each of the different mobile applications 110A, 110B, 110C, 110D, 110E and each other of the different mobile applications 110A, 110B, 110C, 110D, 110E published for deployment to different mobile devices 120.

Each of the different mobile applications 110A, 110B, 110C, 110D, 110E may be represented in the graph 140 as a node and the edges connecting each of the nodes annotated with a relatedness value such as a number whose value indicates a position in a range of relatedness from low to high, or a symbol indicative of a low, medium or high degree of relatedness, as two such examples. The relatedness itself is determined based upon meta-data associated with each of the different mobile applications 110A, 110B, 110C, 110D, 110E. The meta-data may include an application title and an application description. Each word or phrase in an application title or description of one of the different mobile applications 110A, 110B, 110C, 110D, 110E that is similar or common to a word or phrase in an application title or description of another of the different mobile applications 110A, 110B, 110C, 110D, 110E is deemed to indicate a point of relation. A greater number of points of relation therefore indicate a higher degree of relatedness.

A selection 110A, 110D, 110E of the different mobile applications 110A, 110B, 110C, 110D, 110E are installed into the memory 130 of the mobile device 120. In response, a subset 160 of the graph 140 is created by applying an installed application filter 150 to the graph 140 so that only portions of the graph 140 pertaining to the selection 110A, 110D, 110E remain in the subset 160. A monitor 170 then monitors performance metrics 180 of a foreground executing one 110D of the applications in the selection 110A, 110D, 110E so as to identify poor performance by the executing one 110D of the applications in the selection 110A, 110D, 110E. One or more background executing ones of the applications in the selection 110A, 110D, 110E are then inspected by detection logic 190 to identify operating characteristics of a related one 110A of the background executing applications in the selection 110A, 110D, 110E.

Specifically, detection logic 190 computes resource utilization by related one 110A of the applications in the selection 110A, 110D, 110E such as memory consumption or a number of requests issued to the network stack of the mobile device 120. The computed resource utilization by the related one 110A of the applications in the selection 110A, 110D, 110E is compared to the performance of the foreground executing one 110D of the applications in the selection 110A, 110D, 110E. To the extent that the detection logic 190 computes a performance of the foreground executing one 110D of the applications in the selection 110A, 110D, 110E to be poor, and the resource utilization of the related one 110A of the applications in the selection 110A, 110D, 110E to be high, the detection logic 190 generates a notification 175 that the related one 110A of the applications in the selection 110A, 110D, 110E to be interfering with the performance of the foreground executing one 110D of the applications in the selection 110A, 110D, 110E. Optionally, the detection logic 190 may then apply an annotation 185 to the graph 140 indicating the interference by the related one 110A of the applications in the selection 110A, 110D, 110E with the performance of the foreground executing one 110D of the applications in the selection 110A, 110D, 110E.

Figure 2:
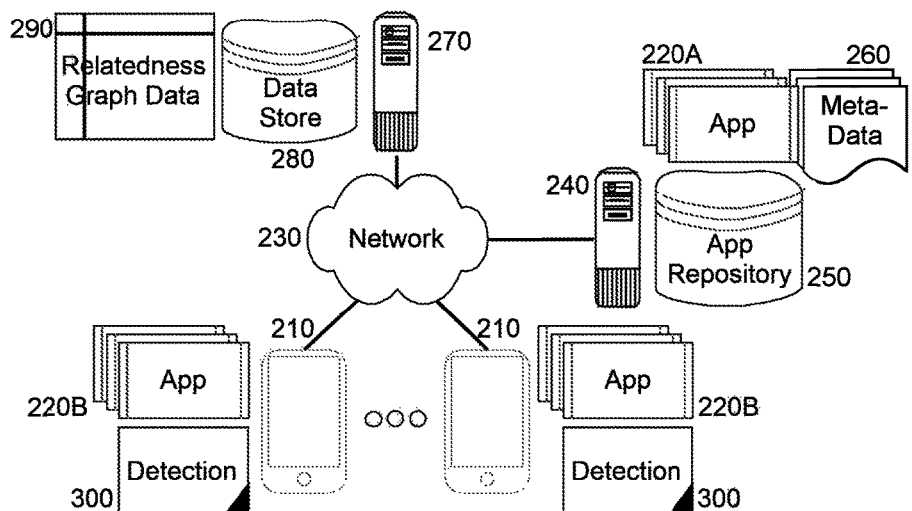
FIG. 2 is a schematic illustration of a mobile data processing system configured for malware collusion detection; and, FIG. 3 is a flow chart illustrating a process for malware collusion detection in a mobile computing device.

The process described in connection with FIG. 1 may be implemented in a mobile data processing system. In yet further illustration, FIG. 2 schematically shows a mobile data processing system configured for malware collusion detection. The system includes multiple different mobile devices 210, each with memory, a display and at least one processor. Each of the device 210 periodically communicates with a server 240 coupled to an application repository 250 in which a multiplicity of different mobile applications 220A are stored and published for deployment onto requesting ones of the devices 210. As such, each of the devices 210 includes a set of applications 220B that are a subset of the applications 220A of the application repository 250.

Separately, an additional server 270 is communicatively coupled to the devices 210. The additional server 270 is coupled to a data store 280 in which relatedness graph data 290 is stored. The relatedness graph data 290 reflects a relatedness between different pairs of the applications 220A in the application repository 250 ranging from no relatedness to a high degree of relatedness. The relatedness graph data 290 is derived from meta-data 260 provided with each of the applications 220A in the repository. Optionally, the relatedness graph data 290 also may be derived from published documentation referring to corresponding ones of the applications 220A in the application repository 250 and accessible over the global Internet, for instance Web pages indexed by way of the World Wide Web.

A detection module 300 is stored in and executes in the memory of each of the devices 210. The detection module 300 includes program code that during execution, retrieves a subset of the relatedness graph data 290 into memory of a corresponding one of the devices 210 limited to the applications 220B installed in the corresponding one of the devices 210. The program code further monitors the performance of a foreground one of the applications 220B and also the resource consumption of background ones of the applications 220B. As such, a baseline performance of both the foreground ones of the applications 220B and the resource consumption of the background ones of the applications 220B may be determined. Consequently, a threshold variance of the baseline performance of the foreground ones of the applications 220B in connection with a threshold variance of a baseline resource consumption of the background ones of the applications 220B may result in a determination of suspected malware conclusion. Thus, the program code then determines if a background one of the applications 220B with a high degree of relatedness according to the subset of the relatedness graph data 290 is interfering with the operation of the foreground one of the applications 220B so as to indicate malware collusion. If so, the program code of the detection module 300 renders an alert in a display of a corresponding one of the devices 210.

Notably, the program code of the detection logic 300 in response to detecting malware collusion, may upload an annotation to the relatedness graph data indicating that the interfering one of the applications 220B interferes with the foreground executing one of the applications. The annotation then may be provided to a different one of the devices 210 when the interfering one of the applications 220B is installed onto the different one of the devices 210. Optionally, the annotation may be removed when a new version of the interfering one of the applications 220B is published in the application repository 250 in substitute for the version of the interfering one of the applications 220B determined to have engaged in malicious inter-application interaction. As such, the annotations indicating malware collusion may be crowdsourced in the relatedness graph data 290.

Figure 3:
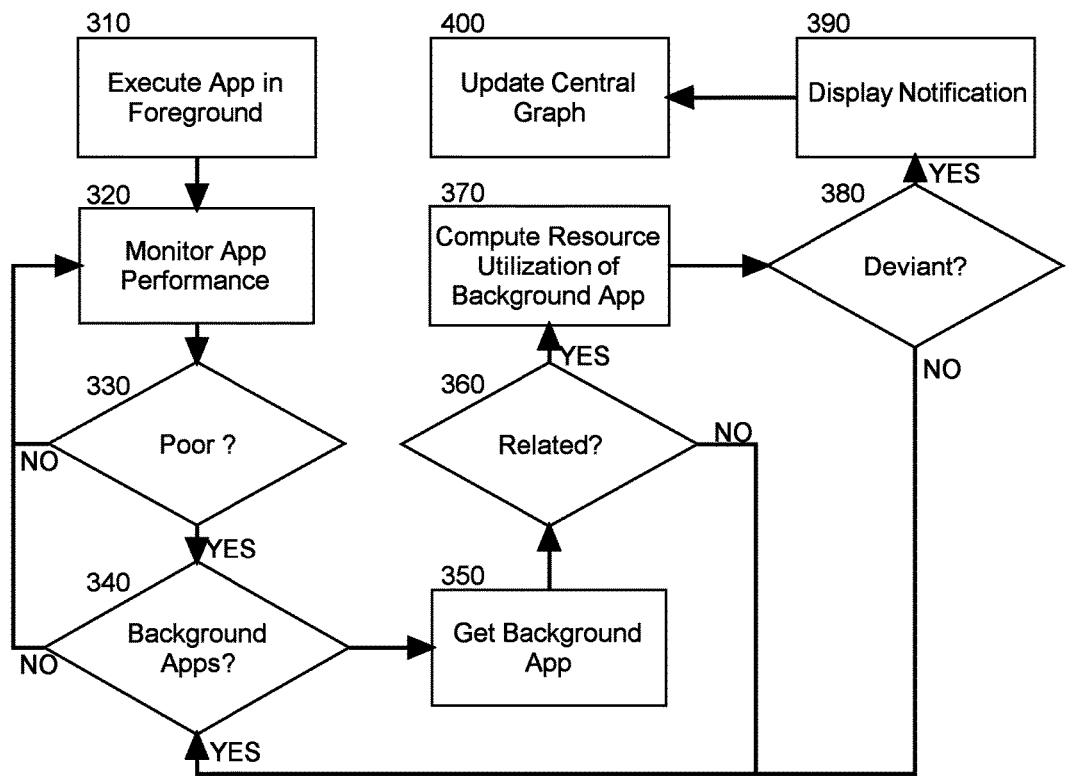

In even yet further illustration of the operation of the detection module 300, FIG. 3 is a flow chart illustrating a process for malware collusion detection in a mobile computing device. Beginning in block 310, a mobile application installed onto a mobile device executes in the foreground of the mobile device. In block 320, the detection module 300 monitors the performance of the foreground application. In decision block 330, the detection module 300 determines if the performance of the foreground application is poor. In this regard, the detection module 300 compares the historical performance of the foreground application to the contemporaneously computed performance. The detection module 300 deems performance poor when the computed performance falls below a threshold value of the historical performance.

In decision block 300, if the detection module 300 determines the performance of the foreground application to be poor, in decision block 340 the detection module 300 determines if one or more applications execute in the background of the mobile device and remain to be analyzed. If so, in block 350 the detection module 300 selects a first of the background applications and in block 360, the detection module 300 determines if the selected background application is related. If not, the detection module 300 determines in decision block 340 if additional background applications remain to be analyzed. But, in decision block 360, if the detection module 300 determines that a selected background application is related to the foreground application, in block 370 the detection module 300 computes resource utilization by the selected background application.

In decision block 380, the detection module 300 determines if the resource utilization by the selected background application is deviant from a historically measured utilization of resources when the selected background application executes in the background of the mobile device while a different, unrelated application executes in the foreground of the mobile device. If so, in block 390 the detection module 300 displays a notification in a display of the mobile device alerting the end user of the malware collusion by the background application with the foreground application. As well, in block 400 the detection module 300 transmits an update to the graph specifying the malware collusion.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for malware collusion detection in a mobile computing device, the method comprising:
    filtering applications installed in the mobile device to identify a set of related applications;
    monitoring, by the mobile device, computing operations associated with execution of the related applications in the set of related applications;
    determining, based upon the monitoring, that resource utilization is high for a first related application of the set of related applications, which first application is executing in a background of the mobile device;
    determining, based upon the monitoring, that computing execution performance is low for a second related application of the set of related applications; and, responsive to the determination that the resource utilization for the first related application is high, and further responsive to the determination that computing execution performance for the second related application is low, generating a notification in the display of the mobile device that the first related application of the set of related applications is suspected of malware collusion with the second related application of the set of related applications.

2. The method of claim 1, wherein the filtering comprises: receiving in memory of the mobile device from a server from over a computer communications network, relatedness information indicated that the set of related applications are related.

3. The method of claim 2, wherein: the relatedness information is in the form of a graph; and the graph is a portion of a larger graph of additional applications published for distribution to a multiplicity of mobile devices; and the larger graph is annotated to indicate the one of the related applications suspected of malware collusion with the different one of the related applications.

4. The method of claim 1, wherein the determination of that resource utilization is high includes: determining memory consumption of the first application.

5. The method of claim 1, wherein the determination that resource utilization is high includes: determining a number of requests issued, by the first application, to a network stack of the mobile device.

6. The method of claim 1, wherein resource utilization of the first application is considered to be high based on a difference between the following: (i) resource utilization of the first application when the first application is running in the background and the second application is running in the foreground, and (ii) resource utilization of the first application when the first application is running in the background and the second application is not running in the foreground.

7. A computer program product (CPP) for malware collusion detection in a mobile computing device, the CPP comprising:
   a storage device for storing code executable by a processor(s) set; and
   computer code stored in the storage device, with the computer code including machine readable instructions and data for causing the processor(s) set to perform operations including at least the following:
   filtering applications installed in the mobile device to identify a set of related applications,
   monitoring, by the mobile device, computing operations associated with execution of the related applications in the set of related applications,
   determining, based upon the monitoring, that resource utilization is high for a first related application of the set of related applications, which first application is executing in a background of the mobile device,
   determining, based upon the monitoring, that computing execution performance is low for a second related application of the set of related applications, and,
   responsive to the determination that the resource utilization for the first related application is high, and further responsive to the determination that computing execution performance for the second related application is low, generating a notification in the display of the mobile device that the first related application of the set of related applications is suspected of malware collusion with the second related application of the set of related applications.

8. The CPP of claim 7, wherein the filtering comprises: receiving in memory of the mobile device from a server from over a computer communications network, relatedness information indicated that the set of related applications are related.

9. The CPP of claim 8, wherein: the relatedness information is in the form of a graph; and the graph is a portion of a larger graph of additional applications published for distribution to a multiplicity of mobile devices; and the larger graph is annotated to indicate the one of the related applications suspected of malware collusion with the different one of the related applications.

10. The CPP of claim 7, wherein the determination of that resource utilization is high includes: determining memory consumption of the first application.

11. The CPP of claim 10 further comprising the set of processor(s), wherein the CPP is in the form of a computer system.

12. The CPP of claim 7, wherein the determination that resource utilization is high includes: determining a number of requests issued, by the first application, to a network stack of the mobile device.

13. The CPP of claim 12 further comprising the set of processor(s), wherein the CPP is in the form of a computer system.

14. The CPP of claim 7, wherein resource utilization of the first application is considered to be high based on a difference between the following: (i) resource utilization of the first application when the first application is running in the background and the second application is running in the foreground, and (ii) resource utilization of the first application when the first application is running in the background and the second application is not running in the foreground.

15. The CPP of claim 7 further comprising the set of processor(s), wherein the CPP is in the form of a computer system.

* * * * *